(No Model.)
H. R. FULLER.
SYSTEM OF PENMANSHIP.
No. 477,653. Patented June 28, 1892.
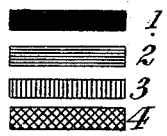
Witnesses:
Inventor:

UNITED STATES PATENT OFFICE.

HARVEY R. FULLER, OF BUTLER, INDIANA.

SYSTEM OF PENMANSHIP.

SPECIFICATION forming part of Letters Patent No. 477,653, dated June 28, 1892.

Application filed December 18, 1891. Serial No. 415,497. (No specimens.)

*To all whom it may concern:*

Be it known that I, HARVEY R. FULLER, a citizen of the United States, residing at Butler, in the county of De Kalb and State of Indiana, have invented a certain new and useful System of Penmanship, for which I desire to secure Letters Patent, of which the following is a specification.

My invention relates to that class or variety of penmanship known as "letter-printing" or "lettering penmanship;" and my object is to devise and set forth a simple yet comprehensive system of letter-formation whereby those skilled in the use of the pen, pencil, crayon, or brush may write or form the letters of the alphabet with ease and facility and whereby a thorough knowledge of the art may be acquired or imparted to others in the shortest possible time and with the least labor possible. According to my system, the various letters of the English alphabet are formed of two characters, which may be denominated "principles" or "elements," these being variously arranged, combined, and blended together to form symmetrical letters, whether capitals or "lower case," all as will be hereinafter fully set forth and described.

In the accompanying drawing, which illustrates my system and forms a part of this specification, the several letters of the alphabet are portrayed, as well as the principles or elements employed in their formation, showing the manner of arranging and combining said elements and indicating by means of shade-lines the order in which they are produced, and also the initial, final, and intermediate stroke lines in the formation of each letter.

First, as to the elements or principles of which the letters are constructed: As above indicated, two principles only are employed and these, broadly and briefly stated, each comprise a straight line or body with introductory and final lateral lines projecting from both ends, said lateral lines in one case being both on the same side and in the other case on the opposite side, the said introductory and final lines of each principle being parallel to each other, all being formed on substantially the same slant, so that in combining and arranging them in the formation of letters the said introductory and final line of adjoining principles where they are connected will meet each other on right lines.

In the drawing, the principles are designated by the numerals 1 2. That marked 1 I call, for convenience, the "first principle" and that marked 2 the "second principle," and so on. The first principle then consists of a straight line or body, (marked *a*,) to the two ends of which are joined introductory and final lines, (marked *b c*,) the introductory line *b* being on the left and the final line *c* on the right, the first beginning and the second terminating on straight hair-lines which are parallel to each other. My second principle, like the first, comprises a straight body portion (marked *d*) with lateral introductory and final lines, (marked *e f*,) these latter in this case being both on the same side and, as in the first principle, both terminating at their outer ends in hair-lines, having the same slant or angle, or, in other words, being parallel to each other. Each of these principles is formed without lifting the pen or pencil. The introductory line *b* of the first principle may be either straight or curved, the curved being preferable on the account of the appearance of the completed letter; but whether straight or curved its outer end begins with a straight hair line standing on a slant, which will adapt it to be joined on a right line to the final or introductory line of the preceding principle, it being understood from the foregoing description that the straight lines, with which both principles begin and terminate, stand on the same slant. The lateral terminal line *c* may be either curved or straight, it being only essential that it ends in a straight line.

In the second principle the introductory line *e*, which projects laterally from the upper end, comprises a straight line slanting downward and uniting with the body either by a short curve or at an angle, as may be preferred, according to the style of letter to be formed. The terminal line *f* projects from the lower end of the body *d* on the same side with the introductory line and slants downward at the same angle or inclination, so that the said two lines stand in planes parallel to each other.

In the formation of certain letters it becomes necessary to invert or reverse the second principle so that the introductory and terminal lines will stand in the opposite direction, such inversion or reversal being indicated by broken lines. The form of the principle remains the same in whichever of these positions it is used, the slant-lines in one position inclining downward from the body toward the left and in the other position inclining upward toward the right.

Having thus described the principles of which the letters are formed, I will next proceed to a description of the manner of combining and arranging in forming the letters. Each letter is formed by a succession of strokes, either simple or compound, and in the drawing I designate each separate part of each letter formed without lifting the pencil or pen, also the consecutive order in which the several parts of letters are formed by distinguishing shade-lines, such shade-lines being shown in the chart or key at the head of the drawing and designated by the numerals 1 2 3 4 in the order in which they are used in the formation of letters. For example, that part of each letter formed by the first or initial stroke is indicated in solid black (marked 1) in the chart or key; the second part by horizontal shade lines, (marked 2;) the third part by vertical lines, (marked 3,) and the fourth part by checked lines, (marked 4.) In my system no letter requires more than four strokes in its formation, and therefore the four distinguishing indications of the chart are sufficient in any case.

It is an established fact that in teaching and acquiring penmanship the best results are secured by always forming the different parts of the same letter in its proper consecutive order, so that the connections between the different parts may be made with uniformity and that the various parts may blend together. This is especially necessary in shaded work, in order that the shade-lines may continue in unbroken lines, uniting parts of the letter together, and therefore the parts must be made in proper order.

Referring to the letter O, as in chart, as an example, it will be seen that it is composed of three parts—i. e., it requires in its formation three strokes of the pen or pencil, or, in other words, the hand is lifted three times from the paper. Beginning with the introductory stroke of the first principle, the stroke is upward and toward the right, then downward on a slant toward the left in a line parallel to the initial upward stroke, then downward in a straight line on the general slant of letters, then toward the right, and ending with the final upward slant-line. This finishes the first part. The pen or pencil is then raised. The second part is a repetition of the upper portion of the first principle or first part. The pen is again raised, and the third part is formed by starting on the initial line of the second part and is made with a curved downward stroke, which completes the letter. These several parts and the order in which they are formed are indicated, as already explained, with reference to chart or key. It is to be observed that the initial stroke in the formation of every letter of the alphabet is an upward stroke toward the right, which renders the system exceedingly simple, easy of comprehension and execution. It will further be observed that in the drawing I have arranged the letters of the alphabet, both upper and lower case, in four groups, separated by short lines or hyphens, with reference to simplicity of construction and likeness of form.

The letters in each group possess characteristics common to all in that group, and I have thus grouped them in order to emphasize the distinguishing characteristics, thereby simplifying the work of both learner and instructor.

Instead of indicating the different parts of the letters and the order in which they are formed by the chart or key above described, I may in preparing such chart or key use different colors instead of shade-lines, as shown and described, the colors being arranged in the same predetermined numerical order.

For the use of small pupils and others unable to read numerals the use of colors instead of shade-lines may and probably will be found preferable.

Having thus described my invention, what I claim as new, and desire to secure by Letters Patent, is—

As a means of teaching penmanship, a book, page, or chart having letters or characters thereon shaded and hatched in part in various distinctive ways, whereby the number of portions, the relative positions of the shaded and hatched portions, and the beginning and ending of each part is indicated by the letters or characters themselves, substantially as set forth.

HARVEY R. FULLER.

Witnesses:
BELLE FULLER,
D. P. COWL.